US012754673B1

(12) United States Patent
Neelannavar

(10) Patent No.: US 12,754,673 B1
(45) Date of Patent: Oct. 6, 2026

(54) ACHIEVING HOST PERFORMANCE BOOSTER (HPB) PERFORMANCE IN NON-VOLATILE MEMORY EXPRESS (NVME) MODE OF MULTI-PROTOCOL STORAGE DEVICES

(71) Applicant: Sandisk Technologies, Inc., Milpitas, CA (US)

(72) Inventor: Savita H. Neelannavar, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/212,914

(22) Filed: May 20, 2025

(51) Int. Cl.
*G06F 3/06* (2006.01)

(52) U.S. Cl.
CPC .......... *G06F 3/0611* (2013.01); *G06F 3/0632* (2013.01); *G06F 3/0656* (2013.01); *G06F 3/0679* (2013.01)

(58) Field of Classification Search
CPC .... G06F 3/0611; G06F 3/0632; G06F 3/0656; G06F 3/0679
See application file for complete search history.

(56) References Cited

U.S. PATENT DOCUMENTS 11,288,183 B2 3/2022 Kim
2019/0138440 A1 5/2019 Lee
2021/0397365 A1* 12/2021 Kim .................... G06F 3/0611
2022/0229789 A1 7/2022 Balakrishnan
2023/0229590 A1* 7/2023 Bi .................... G06F 12/0292 711/154
2024/0184711 A1 6/2024 Boenapalli
2025/0044977 A1* 2/2025 Bhoopali ................ G06F 3/061
2025/0060904 A1* 2/2025 Fu .................... G06F 3/0604
2025/0103482 A1* 3/2025 Neelannavar ....... G06F 12/0246
2025/0123762 A1* 4/2025 Kim .................... G06F 3/0679
2025/0370653 A1* 12/2025 Huang .................. G06F 3/0655

* cited by examiner

*Primary Examiner* — Zhuo H Li

(74) *Attorney, Agent, or Firm* — Arlene P. Neal; NEAL BLIBO LLC

(57) ABSTRACT

A storage device provides enhanced read performance in multiple modes. A controller on the storage device initializes the storage device in a first mode that does not support a host performance booster (HPB) feature and publishes HPB capabilities of a second mode to a host communicating with the storage device in the first mode. The controller configures a host memory buffer (HMB) in response to a command from the host, identifies a control mode for accessing the HMB, loads an L2P mapping for a HPB sub-region into the HMB, and returns HMB information associated with the L2P mappings in the HMB to the host. The controller also receives a HPB read command including logical and physical block addresses and a length retrieved by the host from the HMB and uses received information to retrieve data from a memory device without performing L2P address translation in the storage device.

20 Claims, 6 Drawing Sheets

ACHIEVING HOST PERFORMANCE BOOSTER (HPB) PERFORMANCE IN NON-VOLATILE MEMORY EXPRESS (NVME) MODE OF MULTI-PROTOCOL STORAGE DEVICES

BACKGROUND

A host may transmit a command to read data from and/or write data to, for example, a flash memory device coupled to a storage device. The storage device may store data in blocks on the memory device and the host may address the data using logical block addresses that may be mapped to physical addresses on the memory device. The logical block address to physical address mappings may be stored in a logical-to-physical (L2P) table cached on the storage device. The storage device may access the L2P table to translate a logical block address in a host command to a physical address on the memory device to retrieve data from the memory device.

The storage device may be a multi-protocol/multi-mode device, wherein the storage device may communicate with the host using multiple communications protocols. For example, the storage device may communicate with the host using a Universal Flash Storage (UFS) protocol and a Non-Volatile Memory Express (NVMe) protocol When the storage device and host are communicating using the UFS protocol, the host may compensate for limited dynamic random-access memory (DRAM) on the storage device by using a host performance booster (HPB) feature. When using the HPB feature, the host may allocate an HPB cache (i.e., a buffer on the host memory) to store portions of the entries in the L2P table. The host may not share buffer pointers for the HPB cache with the storage device but may issue a read request to retrieve the logical and physical addresses for data and populate the HPB cache with the logical and physical addresses retrieved from the storage device.

The host and the storage device may use the HPB feature in a host-controlled mode or a device-controlled mode. In the host-controlled mode, the host decides with logical address control pages are to be cached in the HPB cache. In the device-controlled mode, the device decides which logical address control pages are to be cached in the HPB cache. In both modes, a portion of the logical control pages are cached in HPB cache and when the host wants to retrieve data having L2P mapping in the HPB cache, the host may send the logical block address, the physical block address and the length of data to the storage device. The storage device may use the logical block address and physical address provided by the host to access the data faster, i.e., without the storage device using the L2P table on the storage device to translate the logical block address provided by the host to a physical address on the memory device, The HPB feature does not exist in the NVMe protocol. The NVMe protocol includes a host memory buffer (HMB) feature wherein the host may allocate a portion of host memory (i.e., the HMB) that may be used exclusive by the storage device. After the host enables the HMB, the host may not write to the host memory region associated with the HMB. The host may share pointers for the HMB with the storage device and the storage device may use the pointers to access the HMB directly. Until the host disables the HMB, the portion of the host memory allocated as HMB may be used by the storage device for its internal operations. For example, the storage device may use the HMB to store portions of the L2P table. As the HPB feature does not exist in NVMe, when the host and the storage device are communicating using the NVMe protocol, the host may be unable to use the HPB feature to boost the read performance of the storage device.

SUMMARY

In some implementations, the storage device may provide enhanced read performance in multiple modes. A controller on the storage device initializes the storage device in a first mode that does not support a host performance booster (HPB) feature and publishes HPB capabilities of a second mode to a host that is communicating with the storage device in the first mode. The controller configures a host memory buffer (HMB) in response to a command from the host, identifies a control mode for accessing the HMB, loads a logical-to-physical mapping for a HPB sub-region into the HMB, and returns HMB information associated with the HPB sub-region logical-to-physical mappings in the HMB to the host. The controller also receives a HPB read command including a logical block address, a physical block address and a length retrieved by the host from the HMB based on the HMB information; and uses the logical block address, the physical block address and the length to retrieve data from a memory device without performing logical-to-physical address translation in the storage device.

In some implementations, a method is provided for providing enhanced read performance in multiple modes. The method includes initializing the storage device in a first mode that does not support a host performance booster (HPB) feature and publishing HPB capabilities of a second mode to a host that is communicating with the storage device in the first mode. The method also includes configuring a host memory buffer (HMB) in response to a command from the host. The method further includes identifying a control mode for accessing the HMB, loading a logical-to-physical mapping for a HPB sub-region into the HMB, and returning HMB information associated with the HPB sub-region logical-to-physical mappings in the HMB to the host. The method also includes receiving a HPB read command including a logical block address, a physical block address and a length retrieved by the host from the HMB based on the HMB information and using the logical block address, the physical block address and the length to retrieve data from a memory device without performing logical-to-physical address translation in the storage device.

In some implementations, the storage device may provide enhanced read performance in multiple modes. A controller on the storage device may initialize the storage device in a first mode that does not support a host performance booster (HPB) feature and publish HPB capabilities of a second mode to a host that is communicating with the storage device in the first mode. The controller may configure a host memory buffer (HMB) in response to a command from the host. The controller may also identify i) a host-controlled mode for accessing the HMB, load a logical-to-physical mapping for a HPB sub-region into the HMB, and return HMB descriptors associated with the HPB sub-region logical-to-physical mappings in the HMB to the host, or ii) a device-controlled mode for accessing the HMB, load a logical-to-physical mapping for a HPB sub-region into the HMB, and complete asynchronous event request (AER) sent to the host, wherein the host uses information associated with a completed AER to access a logical-to-physical mapping in the HMB to the host. The controller may receive a HPB read command including a logical block address, a physical block address and a length retrieved by the host from the HMB and use the logical block address, the physical block address and the length to retrieve data from a memory device without performing logical-to-physical address translation in the storage device.

Figure 1:
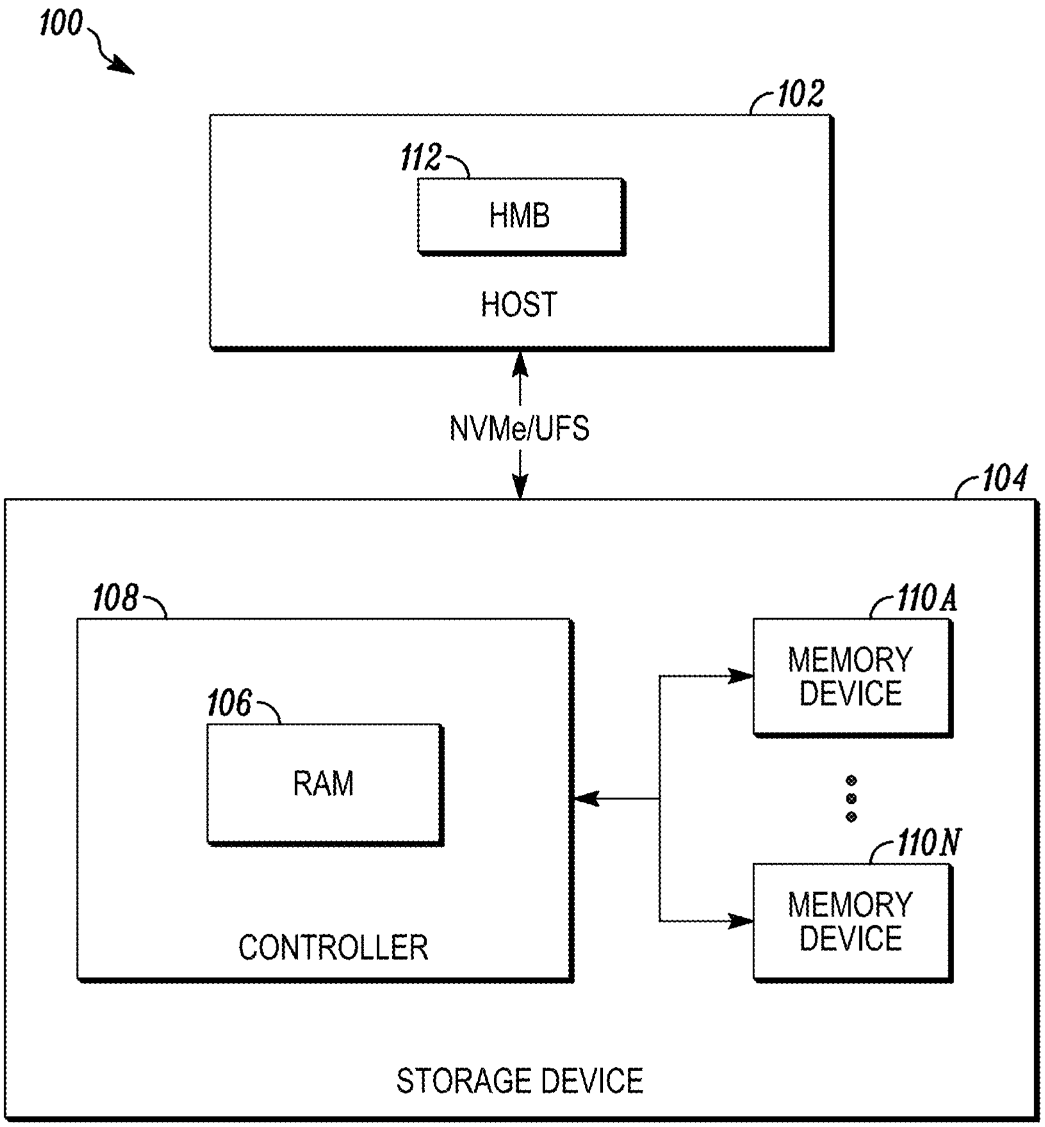
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Host 102 may include a host memory buffer (HMB) 112 (i.e., a portion of host 102 memory that is set aside for storage device 104 to use). When host 102 enables the HMB feature, storage device 104 may use HMB 112 exclusively and host 102 may not write to the host memory region associated with HMB 112 until host 102 disables the HMB feature. Storage device 104 may communicate with host 102 via multiple protocols including, for example, a Non-Volatile Memory Express (NVMe) protocol, a Universal Flash Storage (UFS) protocol, and the like. Host 102 may include additional components (not shown in this figure for the sake of simplicity).

Storage device 104 may be, for example, a multi-mode solid-state drive (SSD) that may communicate with host using two or more protocols. For example, storage device 104 may communicate with host using the NVMe protocol and the UFS protocol. Storage device 104 may include a random-access memory (RAM) 106, a controller 108, and one or more storage components such as non-volatile memory devices 110*a*-110*n* (referred to herein as the memory device(s) 110). RAM 106 may be, for example, static RAM (SRAM) or dynamic RAM (DRAM) that be used to temporarily store data on storage device 104. For example, RAM 106 may store portions of a logical-to-physical (L2P) table that may be used to map a logical block address (LBA) in a host command to a physical address on memory device 110. Storage device 104 may also use HMB 112 for its internal operations.

Controller 108 may interface with host 102 and process foreground operations including instructions transmitted from host 102. For example, controller 108 may read data from and/or write to memory devices 110 based on instructions received from host 102. Controller 108 may also execute background operations to manage resources on memory device 110. For example, controller 108 may monitor memory devices 110 and may execute garbage collection and other relocation functions per internal relocation algorithms to refresh, recycle, and/or relocate the data on memory devices 110.

Memory devices 110 may be flash based. For example, memory devices 110 may be a NAND or NOR flash memory that may be used for storing host and control data over the operational life of memory devices 110. Memory devices 110 may include one or more dies (i.e., DIE 0-DIE N) connected to a memory bus including data lines and chip enable lines. Memory devices 110 may save data in blocks in various formats, with the formats being defined by the number of bits that may be stored per memory cell. Memory device 110 may be included in storage device 104 or may be otherwise communicatively coupled to storage device 104.

When storage device 104 is communicating with host 102 using the UFS protocol, host 102 may boost the read performance of storage device 104 by allocating the Host Performance Booster (HPB) cache in host memory. The HPB cache may be used for storing portions of the L2P table used by storage device 104. When the L2P table is loaded into a HPB region in the HPB cache, host 102 may access the HPB cache to enhance the read performance of storage device 104 using the HPB feature. The HPB feature may be used in a host-controlled mode or a device-controlled mode. In the host-controlled mode, host 102 may decide which logical address control pages are to be cached in the HPB cache. In the device-controlled mode, storage device 104 may decide which logical address control pages are to be cached in the HPB cache. As such, in the host-controlled mode and the device-control mode, some logical control pages may be cached in the HPB cache.

Host 102 may boost the read performance of storage device 104 by retrieving the logical block address, physical block address and data length from the HPB cache and sending the retrieved information to the storage device 104 as part of a read command. Rather than using the L2P table on storage device 104 to translate the logical block address in the read command to a physical address on memory device 110, storage device may use the information in the read command to access the data on memory device 110, thereby accessing the data faster than if storage device 104 were to perform the L2P translation.

When storage device 104 is communicating with host 102 using the NVMe protocol, during initialization, host 102 may issue an identify command to storage device 104. Storage device 104 may publish its HPB capabilities through an identify controller command and an identify namespaces command of NVMe. For example, storage device 104 may publish global HPB specific features in the identify controller command of NVMe. The global HPB specific features provided in the identify controller command of NVMe may include HPB specific fields that may be provided in a device descriptor in USF including the HPB version, HPB control, etc. Storage device 104 may use the identify namespaces command of NVMe to publish HPB logical unit specific features that may be provided in unit descriptors in UFS including, for example, a logical unit enable field, the maximum number of active HPB regions, etc. When storage device 104 publishes its HPB capabilities in the identify controller and identify namespaces commands, storage device 104 may send a command complete response to host 102.

After storage device 104 is initialized in NVMe mode, if host 102 is to implement the HPB feature in a host-controlled mode, host 102 may issue a HMB set feature command to storage device 104. The HMB set feature command may specify HMB 112 as a feature identifier and provide the amount of host buffer associated with HMB 112. Storage device may configure HMB 112 and send a command complete response to host 102. Host 102 may issue vendor specific command (for example, a HPB set feature command) specifying the host-controlled mode. In response to the command, storage device may load the HPB sub-regions L2P mapping in HMB 112. Host 102 may issue another vendor specific command (for example, a HPB get feature command) to storage device 104. In response, storage device 104 may return the HMB descriptors which may be used to load the HPB sub-region L2P mappings into HMB 112. Once host 102 knows the HMB buffer descriptors where the HPB L2P mappings are placed, host 102 may directly access HMB 112 for read-only mode. To improve the HPB read performance, when issuing a HPB read command to storage device 104, host 102 may refer to the L2P mappings kept in HMB 112 and retrieve a physical block address (PBA), a logical block address (LBA) and a length. Rather than using the L2P table on storage device 104 to translate the logical block address in the read command to a physical address on memory device 110, storage device may use the information in the HPB read command to access the data on memory device 110, thereby accessing the data faster than if storage device 104 were to perform the L2P translation.

After storage device 104 is initialized in NVMe mode, if host 102 is to implement the HPB feature in a device-controlled mode, host 102 may issue a HMB set feature command to storage device 104. The HMB set feature command may specify HMB 112 as a feature identifier and provide the amount of host buffer associated with HMB 112. Storage device may configure HMB 112 and send a command complete response to host 102. Host 102 may issue vendor specific command (for example, a HPB set feature command) specifying the device-controlled mode. Storage device 104 may make note of this command and send a command completion response to host 102. Storage device 104 may send an asynchronous event request (AER) to host 102. Host 102 may process the AER command and issue another vendor specific command (for example, a HPB get feature command) to storage device 104. When storage device 104 loads the L2P mappings into HMB 112 for the HPB sub-region that it has activated, storage device 104 may complete a pending AER command. Using the information returned from the HPB get feature command (for example, information associated with the completed AER command), host 102 may refer to the L2P table in HMB 112 to issue a HPB read command including a logical block address, physical block address and data length. Rather than using the L2P table on storage device 104 to translate the logical block address in the read command to a physical address on memory device 110, storage device may use the information in the HPB read command to access the data on memory device 110, thereby accessing the data faster than if storage device 104 were to perform the L2P translation.

As noted, controller 108 may also execute background operations to manage resources on memory device 110. For example, controller 108 may monitor memory devices 110 and execute garbage collection and other relocation functions per internal relocation algorithms to refresh, recycle, and/or relocate the data on memory devices 110. In such cases, storage device 104 invalidates old L2P mappings and stores new L2P mappings. When HPB regions are cached in HMB 112, storage device 104 may keep a copy of new mappings resulting from background operations and/or overwrites coming from host 102 in RAM 106 and/or in another region HMB 112. If storage device 104 stores the copy of the new mappings in HMB 112, during an idle period, controller 108 may update the entries in HMB 112 with the copy of the new mappings. If the copy of the new mappings is stored in RAM 106, at any point in time, controller 108 may complete an AER command indicating the entries in HMB 112 have to be updated. Host 102 may not access the HPB entries in HMB 112 prior to the entries being updated by controller 108. When controller 108 completes updating the HPB entries in HMB 112, controller 108 may send an AER command to host indicating that storage device 104 has updated the HMB-HPB entries and that host 102 may access the HPB entries in HMB 112.

In the host-controlled mode and the device-controlled mode, host 102 may issue a command to reset the HMB configuration, indicating to storage device 104 that the L2P mappings may be released. When host 102 disables the HMB feature, the HPB feature in NVMe may also be disabled.

Host 102 may thus enhance read performance when a multi-protocol storage device 104 operates in NVMe mode. Unlike when using the UFS protocol, host 102 may not send an explicit HPB read buffer command when in NVMe mode. Nevertheless, host 102 may utilize HMB 112 which may be read by storage device 104 and host 102. Host may use the disclosed process not only for HPB regions but also for regular user areas which may be written once and read many times.

Storage device 104 may perform these processes based on a processor, for example, controller 108 executing software instructions stored by a non-transitory computer-readable medium, such as storage component including, for example, memory device 110. As used herein, the term "computer-readable medium" refers to a non-transitory memory device. Software instructions may be read into the storage component from another computer-readable medium or from another device. When executed, software instructions stored in the storage component may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
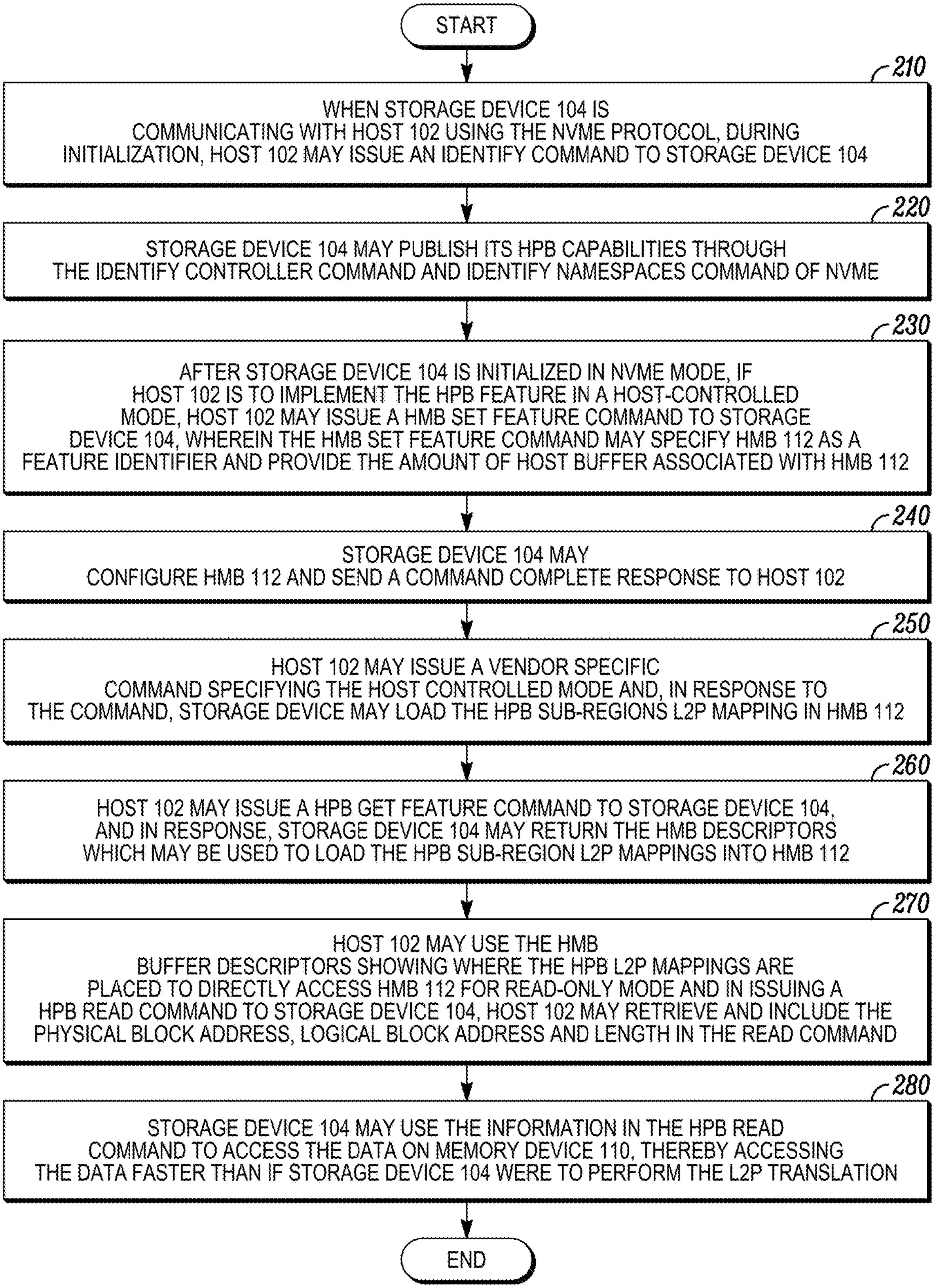
FIG. 2 is an example flow diagram for enhance read performance on a multi-protocol storage device using a HBP feature in accordance with some implementations.

FIG. 2 is an example flow diagram for enhancing read performance on a multi-protocol storage device using a HBP feature in accordance with some implementations. At 210, when storage device 104 is communicating with host 102 using the NVMe protocol, during initialization, host 102 may issue an identify command to storage device 104. At 220, storage device 104 may publish its HPB capabilities through the identify controller command and identify namespaces command of NVMe. At 230, after storage device 104 is initialized in NVMe mode, if host 102 is to implement the HPB feature in a host-controlled mode, host 102 may issue a HMB set feature command to storage device 104, wherein the HMB set feature command may specify HMB 112 as a feature identifier and provide the amount of host buffer associated with HMB 112. At 240, storage device 104 may configure HMB 112 and send a command complete response to host 102. At 250, host 102 may issue a vendor specific command (for example, a HPB set feature) specifying the host-controlled mode and, in response to the command, storage device may load the HPB sub-regions L2P mapping in HMB 112. At 260, host 102 may issue a HPB get feature command to storage device 104, and in response, storage device 104 may return the HMB descriptors which may be used to load the HPB sub-region L2P mappings into HMB 112. At 270, host 102 may use the HMB buffer descriptors showing where the HPB L2P mappings are placed to directly access HMB 112 for read-only mode and in issuing a HPB read command to storage device 104, host 102 may retrieve and include the physical block address, logical block address and length in the read command. At 280, storage device 104 may use the information in the HPB read command to access the data on memory device 110, thereby accessing the data faster than if storage device 104 were to perform the L2P translation. As indicated above FIG. 2 is provided as an example. Other examples may differ from what is described in FIG. 2.

Figure 3:
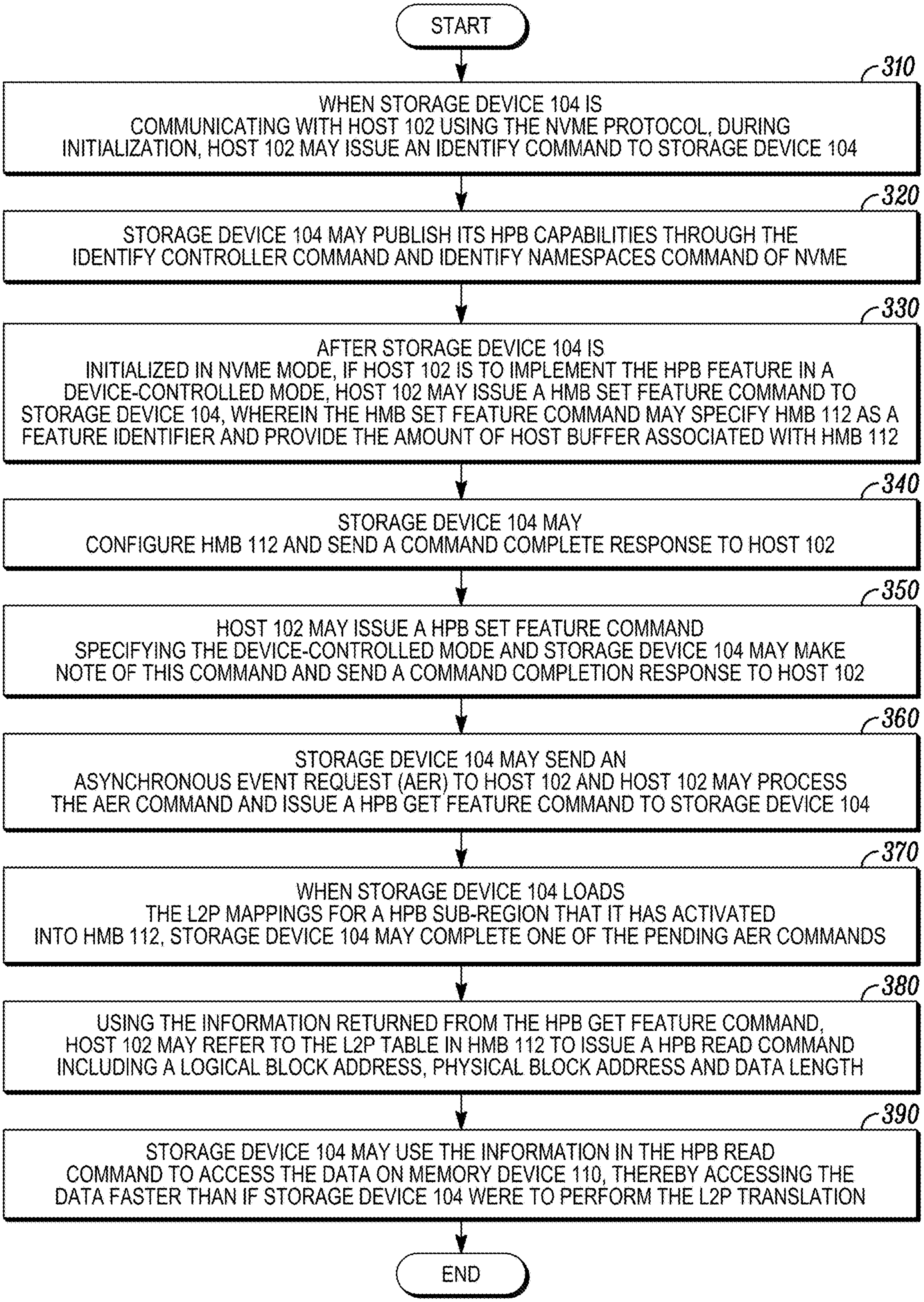
FIG. 3 is another example flow diagram for enhance read performance on a multi-protocol storage device using a HBP feature in accordance with some implementations.

FIG. 3 is another example flow diagram for enhancing read performance on a multi-protocol storage device using a HBP feature in accordance with some implementations. At 310, when storage device 104 is communicating with host 102 using the NVMe protocol, during initialization, host 102 may issue an identify command to storage device 104. At 320, storage device 104 may publish its HPB capabilities through the identify controller command and identify namespaces command of NVMe. At 330, after storage device 104 is initialized in NVMe mode, if host 102 is to implement the HPB feature in a device-controlled mode, host 102 may issue a HMB set feature command to storage device 104, wherein the HMB set feature command may specify HMB 112 as a feature identifier and provide the amount of host buffer associated with HMB 112. At 340, storage device 104 may configure HMB 112 and send a command complete response to host 102. At 350, host 102 may issue a HPB set feature command specifying the device-controlled mode and storage device 104 may make note of this command and send a command completion response to host 102. At 360, storage device 104 may send an Asynchronous Event Request (AER) to host 102 and host 102 may process the AER command and issue a HPB get feature command to storage device 104. At 370, when storage device 104 loads the L2P mappings for a HPB sub-region that it has activated into HMB 112, storage device 104 may complete one of the pending AER commands. At 380, using the information returned from the HPB get feature command, host 102 may refer to the L2P table in HMB 112 to issue a HPB read command including a logical block address, physical block address and data length. At 390, storage device 104 may use the information in the HPB read command to access the data on memory device 110, thereby accessing the data faster than if storage device 104 were to perform the L2P translation. As indicated above FIG. 3 is provided as an example. Other examples may differ from what is described in FIG. 3.

Figure 4:
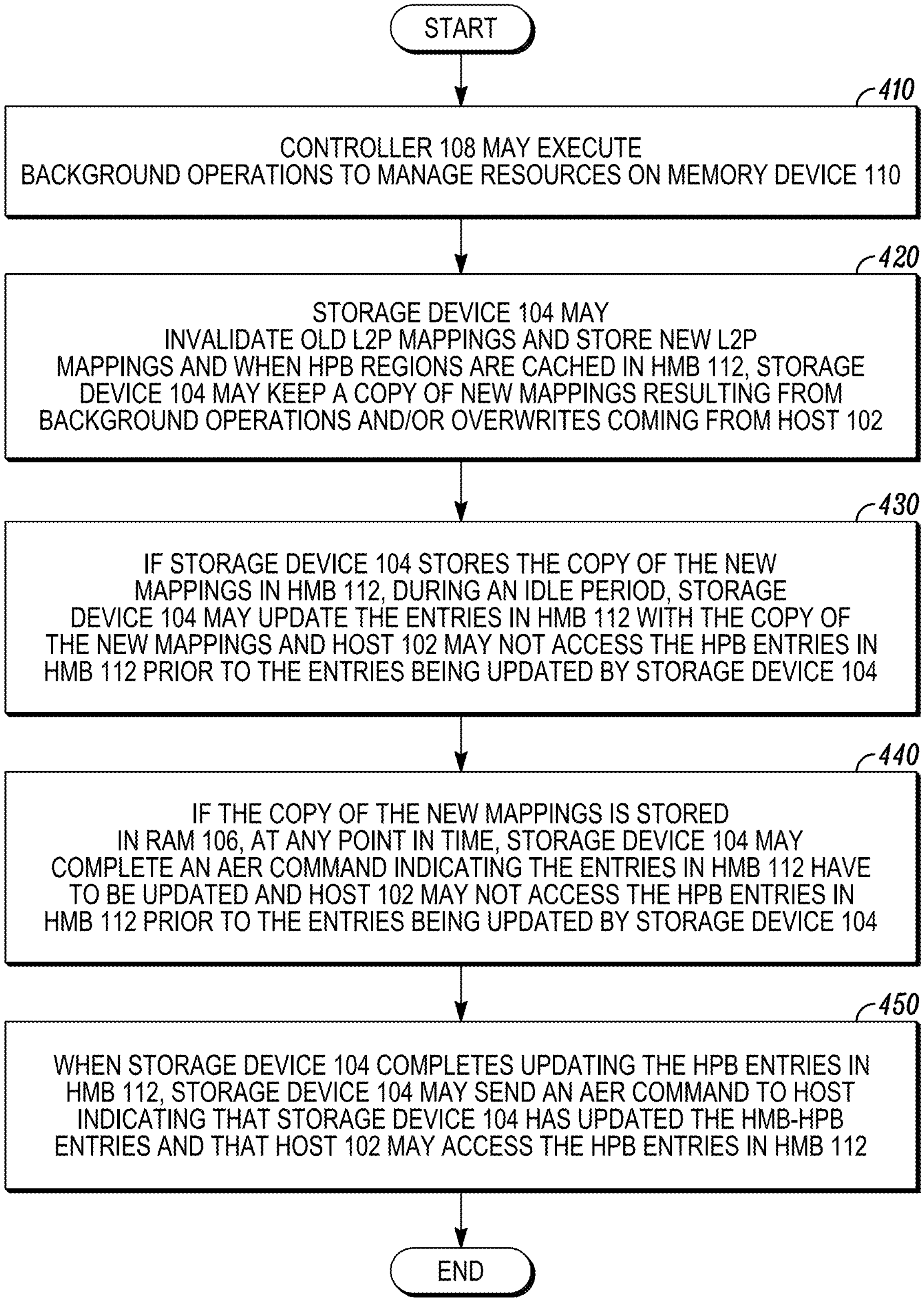
FIG. 4 is a flow diagram of an example process for managing HPB features when the storage device performs background operations in accordance with some implementations.

FIG. 4 is a flow diagram of an example process for managing HPB features when the storage device performs background operations in accordance with some implementations. At 410, controller 108 may execute background operations to manage resources on memory device 110. At 420, storage device 104 may invalidate old L2P mappings and store new L2P mappings, and when HPB regions are cached in HMB 112, storage device 104 may keep a copy for new mappings resulting from background operations and/or overwrites coming from host 102. At 430, if storage device 104 stores the copy of the new mappings in HMB 112, during an idle period, storage device 104 may update the entries in HMB 112 with the copy of the new mappings and host 102 may not access the HPB entries in HMB 112 prior to the entries being updated by storage device 104. At 440, if the copy of the new mappings is stored in RAM 106, at any point in time, storage device 104 may complete an AER command indicating the entries in HMB 112 have to be updated and host 102 may not access the HPB entries in HMB 112 prior to the entries being updated by storage device 104. At 450, when storage device 104 completes updating the HPB entries in HMB 112, storage device 104 may send an AER command to host indicating that storage device 104 has updated the HMB-HPB entries and that host 102 may access the HPB entries in HMB 112. As indicated above FIG. 4 is provided as an example. Other examples may differ from what is described in FIG. 4.

Figure 5:
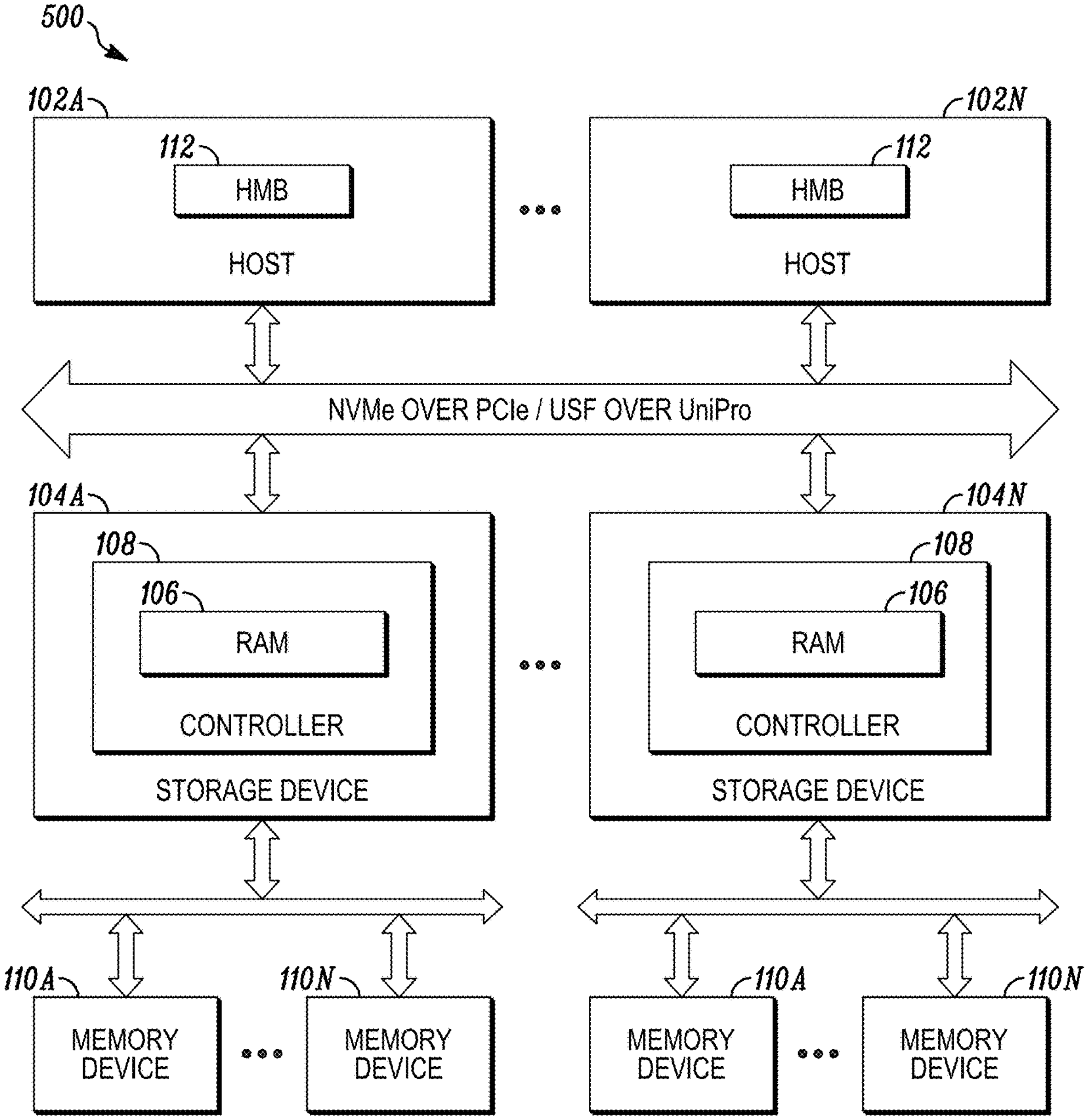
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and storage devices 104*a*-104*n* (referred to herein as storage device(s) 104). Storage device 104 may include a controller 108 to manage the resources on storage device 104. Hosts 102 and storage devices 104 may communicate via NVMe over peripheral component interconnect express (PCI Express or PCIe) standard, the UFS over Unipro, or the like. Host 102 may enhance the read performance of storage device 104 by using the host performance booster feature in a NVMe mode.

Devices of Environment 500 may interconnect via wired connections, wireless connections, or a combination of wired and wireless connections. For example, the network of FIG. 5 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
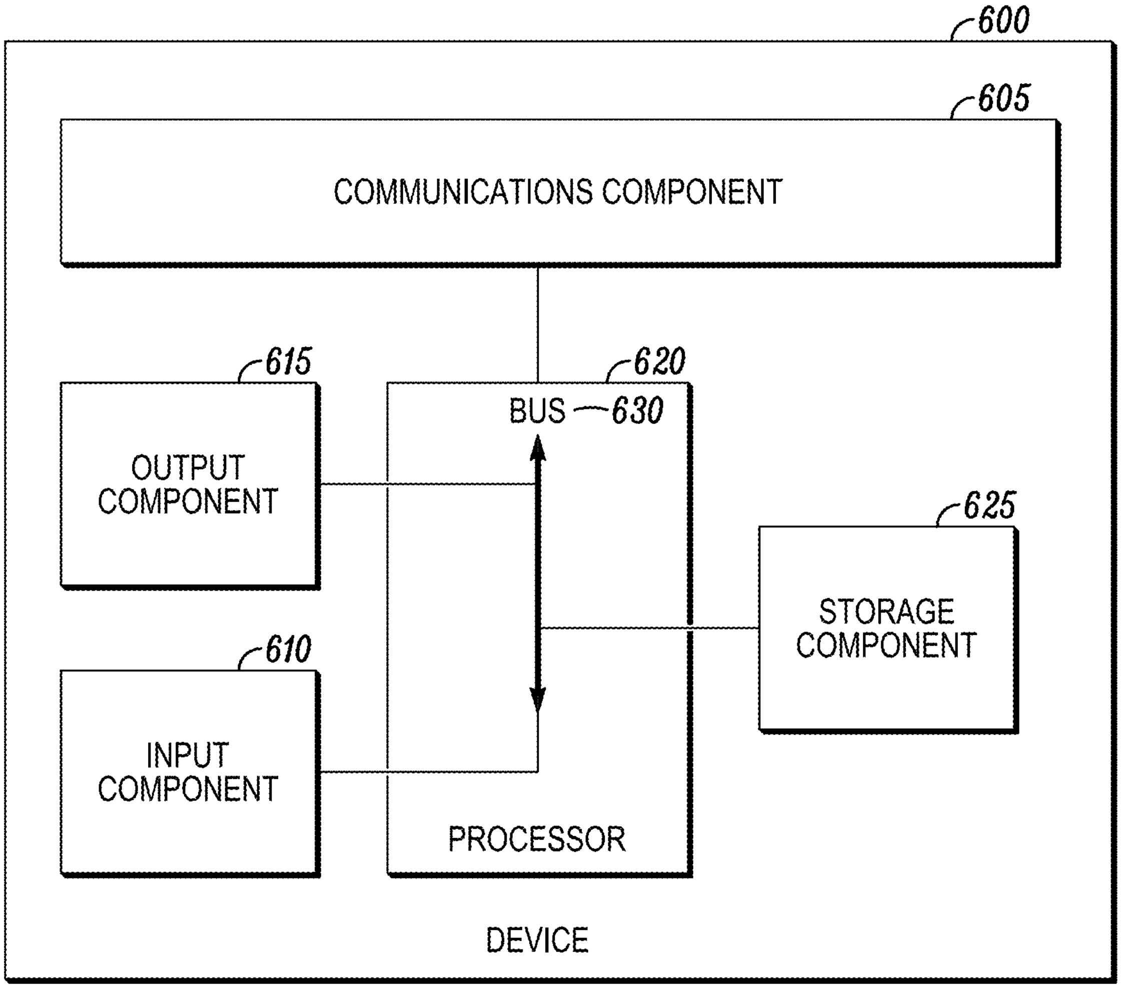
FIG. 6 is a diagram of example components of the host of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone, and/or a display screen), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A storage device to provide enhanced read performance in multiple modes, the storage device comprises:

a controller to initialize the storage device in a first mode that does not support a host performance booster (HPB) feature and publish HPB capabilities of a second mode to a host communicating with the storage device in the first mode;

configure a host memory buffer (HMB) in response to a command from the host;

to identify a control mode to access the HMB, load a logical-to-physical mapping for a HPB sub-region into the HMB, and return HMB information associated with the HPB sub-region logical-to-physical mappings in the HMB to the host;

receive a HPB read command including a logical block address, a physical block address and a length retrieved by the host from the HMB based on the HMB information; and use the logical block address, the physical block address and the length to retrieve data from a memory device without performing logical-to-physical address translation in the storage device.

2. The storage device of claim 1, wherein the storage device communicates with the host in the first mode that does not support the HPB feature and in a second mode that supports the HPB feature.

3. The storage device of claim 1, wherein the controller publishes the HPB capabilities through an identify controller command and an identify namespaces command of the first mode.

4. The storage device of claim 1, wherein the controller configures the HMB in response to a set feature command received from the host, wherein the set feature command specifies the HMB as a feature identifier and provides an amount of host buffer associated with the HMB.

5. The storage device of claim 1, wherein the controller identifies the control mode as one of a host-controlled mode and a device-controlled mode based on a HPB set feature command received from the host.

6. The storage device of claim 1, wherein the controller performs background operations, invalidates an old logical-to-physical mapping, and stores a copy of a new mapping in one of a random-access-memory and the HMB.

7. The storage device of claim 6, wherein when the copy of the new mapping is stored in the HMB, during an idle period, the controller updates entries in the HMB with the copy of the new mapping.

8. The storage device of claim 6, wherein when the copy of the new mapping is stored in the random-access memory, the controller completes an asynchronous event request (AER) command indicating that entries in the HMB are to be updated and the host is not to access HPB entries in the HMB prior to the HPB entries being updated by the controller.

9. The storage device of claim 8, wherein when the controller completes updating the HPB entries in the HMB, the controller sends an indication to the host for the host to access the HPB entries in the HMB.

10. A method in a storage device for providing enhanced read performance in multiple modes, the storage device comprises a controller to execute the method comprising:

initializing the storage device in a first mode that does not support a host performance booster (HPB) feature and publishing HPB capabilities of a second mode to a host communicating with the storage device in the first mode;

configuring a host memory buffer (HMB) in response to a command from the host;

identifying a control mode for accessing the HMB, loading a logical-to-physical mapping for a HPB sub-region into the HMB, and returning HMB information associated with the HPB sub-region logical-to-physical mappings in the HMB to the host;

receiving a HPB read command including a logical block address, a physical block address and a length retrieved by the host from the HMB based on the HMB information; and using the logical block address, the physical block address and the length to retrieve data from a memory device without performing logical-to-physical address translation in the storage device.

11. The method of claim 10, further comprising communicating with the host in the first mode that does not support the HPB feature and in a second mode that supports the HPB feature.

12. The method of claim 10, further comprising publishing the HPB capabilities through an identify controller command and an identify namespaces command of the first mode.

13. The method of claim 10, further comprising configuring the HMB in response to a set feature command received from the host, wherein the set feature command specifies the HMB as a feature identifier and provides an amount of host buffer associated with the HMB.

14. The method of claim 10, further comprising identifying the control mode as one of a host-controlled mode and a device-controlled mode based on a HPB set feature command received from the host.

15. The method of claim 10, further comprising performing background operations, invalidating an old logical-to-physical mapping, and storing a copy of a new mapping in one of a random-access-memory and the HMB.

16. The method of claim 15, further comprising updating updates entries in the HMB with the copy of the new mapping during an idle period when the copy of the new mapping is stored in the HMB.

17. The method of claim 15, further comprising, when the copy of the new mapping is stored in the random-access memory, completing an AER command indicating that entries in the HMB are to be updated and the host is not to access HPB entries in the HMB prior to the HPB entries being updated by the controller.

18. The method of claim 17, further comprising sending an indication to the host for the host to access the HPB entries in the HMB.

19. The method of claim 10, further comprising receiving an indication when the host disables the HMB, indicating to storage device that the HPB feature is disabled in the first mode.

20. A storage device to provide enhanced read performance in multiple modes, the storage device comprises:

a controller to initialize the storage device in a first mode that does not support a host performance booster (HPB) feature and publish HPB capabilities of a second mode to a host communicating with the storage device in the first mode;

configure a host memory buffer (HMB) in response to a command from the host;

to identify one of i) a host-controlled mode to access the HMB, load a logical-to-physical mapping for a HPB sub-region into the HMB, and return HMB descriptors associated with the HPB sub-region logical-to-physical mappings in the HMB to the host, and ii) a device-controlled mode to access the HMB, load a logical-to-physical mapping for a HPB sub-region into the HMB, and complete asynchronous event request (AER) sent to the host, wherein the host uses information associated with a completed AER to access a logical-to-physical mapping in the HMB to the host;

receive a HPB read command including a logical block address, a physical block address and a length retrieved by the host from the HMB; and use the logical block address, the physical block address and the length to retrieve data from a memory device without performing logical-to-physical address translation in the storage device.

* * * * *